United States Patent [19]
Thorp

[11] Patent Number: 5,251,189
[45] Date of Patent: Oct. 5, 1993

[54] WRISTWATCH RADIOTELEPHONE

[75] Inventor: Christopher S. Thorp, Mystic, Conn.

[73] Assignee: Timex Corporation, Middlebury, Conn.

[21] Appl. No.: 962,353

[22] Filed: Oct. 16, 1992

[51] Int. Cl.$^5$ .................. G04F 8/00; G04B 47/00; A44C 5/00

[52] U.S. Cl. ........................... 368/4; 368/10; 368/282; 224/164; 224/165; 379/430

[58] Field of Search ............ 368/4, 10, 276, 277, 368/278, 281–282; 63/1 R, 3, 9, 21; 24/265 WS; 224/164, 165, 174; 59/79.1, 80; 379/90, 428, 430, 433

[56] References Cited

U.S. PATENT DOCUMENTS

| | | | |
|---|---|---|---|
| 704,243 | 7/1902 | Davis | 63/9 |
| 2,120,348 | 6/1938 | Bezault | 63/9 |
| 2,820,275 | 1/1958 | Lancaster | 24/265 WS |
| 3,032,651 | 5/1962 | Gisiger-Stahl et al. | 250/14 |
| 3,940,038 | 2/1976 | Claude | 224/164 |
| 4,847,818 | 7/1989 | Olsen | 368/10 |

FOREIGN PATENT DOCUMENTS 289148  3/1951  Switzerland ............... 63/9

*Primary Examiner*—Vit W. Miska
*Attorney, Agent, or Firm*—Robert R. Jackson; G. Victor Treyz

[57] ABSTRACT

A wristwatch radiotelephone having a plurality of substantially rigid members connected end to end in a series. The members are shaped and positioned to allow the members to be arranged in an arcuate array when the apparatus is to be worn on the wrist as a wristwatch, or in a more elongated, substantially straight array when the apparatus is to be used as a hand-held radiotelephone.

20 Claims, 3 Drawing Sheets

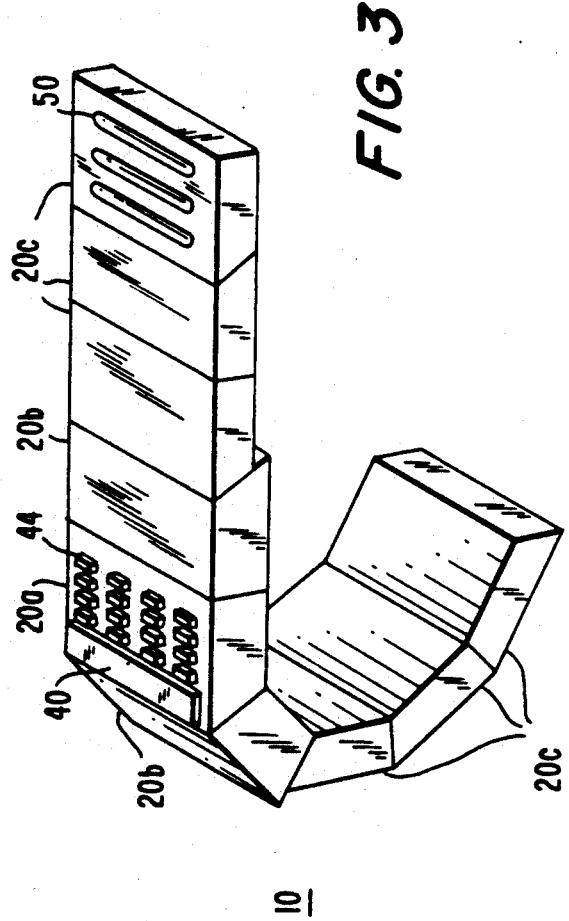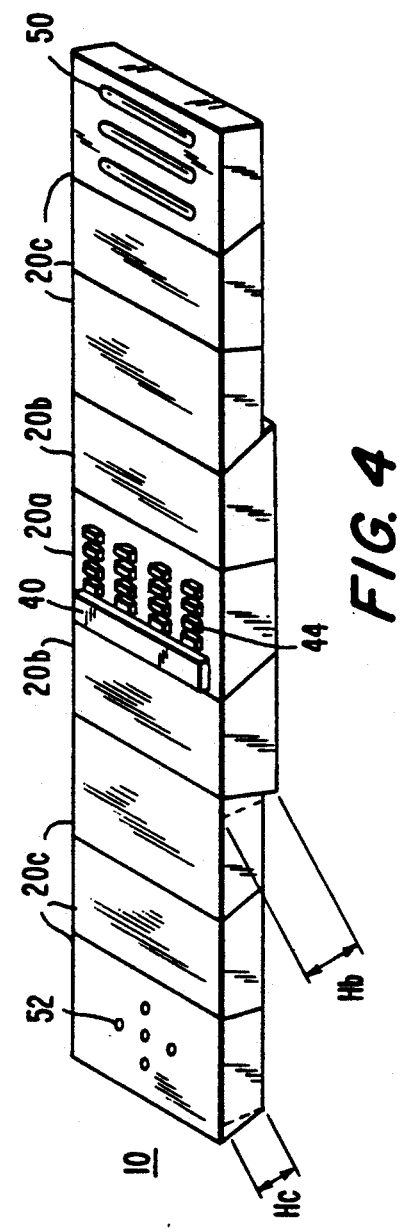

– 1 –

WRISTWATCH RADIOTELEPHONE

BACKGROUND OF THE INVENTION

This invention relates to a combined wristwatch and radiotelephone, and more particularly to a wristwatch which can be converted temporarily to a form suitable for use as a hand-held radiotelephone.

Olsen U.S. Pat. No. 4,847,818 shows a wristwatch which can be removed from the user's wrist and temporarily reconfigured for use as a hand-held radiotelephone. The Olsen apparatus has many desirable features, but it would also be desirable to have a structure which formed the same definite, predetermined shape each time the structure is reconfigured as a radiotelephone. This would tend to give the article a more substantial "feel" when used as a radiotelephone, thereby making the article more acceptable and attractive to at least some users. This would also tend to give the radiotelephone configuration a reliable shape which does not require repeated adjustment for comfort.

In view of the foregoing, it is an object of this invention to provide a wristwatch radiotelephone which can be made to positively assume a definite shape of a first kind when configured for use as a wristwatch, and which can similarly be made to positively assume a definite shape of a second kind when configured for use as a radiotelephone.

It is a more particular object of this invention to provide a wristwatch radiotelephone which can be made to positively assume a predetermined curved shape when configured for use as a wristwatch, and which can be made to positively assume a predetermined elongated shape when configured for use as a radiotelephone.

SUMMARY OF THE INVENTION

These and other objects of the invention are accomplished in accordance with the principles of the invention by providing a wristwatch radiotelephone comprising a plurality of substantially rigid members. These members are joined together end to end by mechanical connections which allow the members to be collectively arranged either in a curved form when the apparatus is to be worn on the wrist as a wristwatch, or in a more longitudinal or elongated series when the apparatus is to be used as a radiotelephone. Each member is so shaped and connected to an adjoining member such that rotation of each member relative to another member permits this rearrangement of the members from a curved form to an elongated, substantially straight form.

Further features of the invention, its nature and various advantages will be more apparent from the accompanying drawings and the following detailed description of the preferred embodiments.

BRIEF DESCRIPTION OF THE DRAWINGS

FIG. 3 is a simplified perspective view of the apparatus of FIG. 1 in a transitional configuration.

FIG. 4 is a simplified perspective view of the apparatus of FIG. 1 opened out to the radiotelephone configuration.

DETAILED DESCRIPTION OF THE PREFERRED EMBODIMENTS

Olsen U.S Pat. No. 4,847,818, which is hereby incorporated by reference herein, shows all of the electronic components and circuitry needed for a wristwatch radiotelephone. All of those same components and circuitry can be used in a wristwatch radiotelephone constructed in accordance with the present invention. Accordingly, it will not be necessary to repeat here any of the details regarding that portion of the apparatus.

Figure 1:
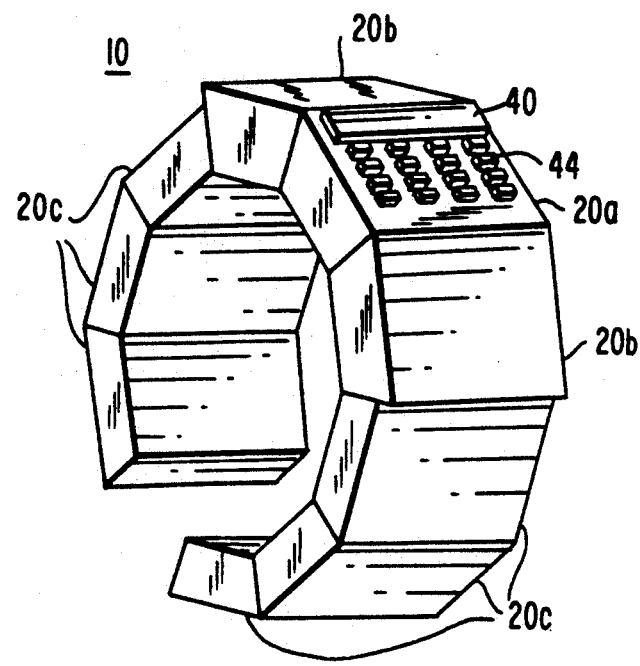
FIG. 1 is a simplified perspective view of an illustrative embodiment of a wristwatch radiotelephone constructed in accordance with the principles of this invention in the wristwatch configuration.
Figure 2:
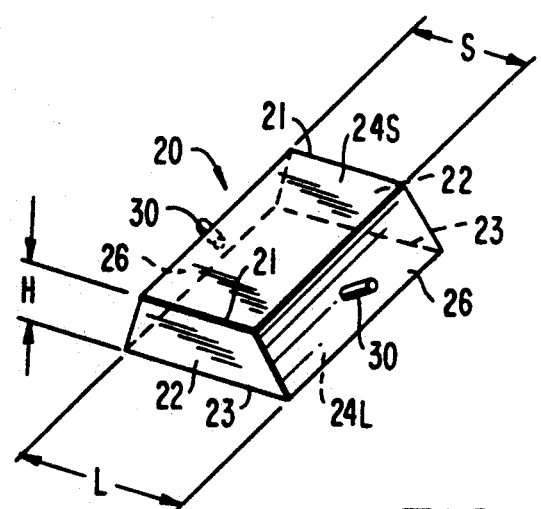
FIG. 2 is a simplified perspective view of an exemplary individual member of the wristwatch band of this invention.

As shown in FIG. 1, an illustrative preferred embodiment of a wristwatch radiotelephone 10 constructed in accordance with this invention includes a plurality of substantially rigid members 20a–c connected together end to end by mechanical connections 30 (shown in FIG. 2). Although wristwatch radiotelephone 10 forms a C-shaped structure, the ends of members 20c which are spaced apart may, instead, abut one another, if desired. However, in the preferred embodiment, this is not necessary.

When arranged as shown in FIG. 1, members 20 form a nearly closed C-shape having a size and shape suitable for allowing the apparatus to be worn on the wrist as a wristwatch. In the depicted preferred embodiment, main body member 20a includes a display 40, and telephone dialing buttons 44 (respectively similar to elements 10 and 12 in the above-mentioned Olsen patent).

When members 20 are arranged in the arcuate form shown in FIG. 1, the inner surfaces of members 20 define a generally arcuate surface which substantially conforms to the shape of the human wrist. The arcuate surface may either be circular or elliptical. If an elliptical shape is desired, members 20 which are to be adjacent the sides of the wearer's wrist are shorter than members 20 which are to be adjacent the top and bottom of the wearer's wrist.

As shown in FIG. 2, each member 20 is preferably a polyhedron having substantially trapezoidal faces 22 substantially perpendicular to the longitudinal axis of the wearer's wrist. Each trapezoidal face has a short edge 21 of length S substantially parallel to a long edge 23 of length L. Wall 24S joins short edges 21 of juxtaposed substantially parallel faces 22, and wall 24L joins long edges 23. Walls 24S and 24L are spaced apart by distance H. Walls 26 join the nonparallel edges of the two juxtaposed parallel trapezoidal faces 22. Mechanical connections 30 are positioned in faces 26 which abut one another to join members 20 to form apparatus 10. In general, connections 30 are positioned substantially equidistant from all edges of face 26. Connections 30 are any connections known in the art which can hold adjacent members 20 together while allowing rotation of abutting members 20 relative to one another. Each connection 30 allows the two members 20 connected by that connection to rotate about an axis which is perpendicular to the faces 26 of the members which about one another adjacent the connection.

Figure 5:
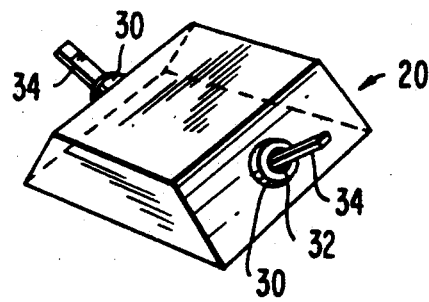
FIG. 5 is a view similar to FIG. 2 showing an alternative embodiment of the invention.

In the alternative embodiment shown in FIG. 5 connections 30 are hollow to provide passageways 32 for electrical connections (not shown) extending between members 20. A prestressed tension elastomeric band 34 may also pass through passageways 32 to hold members 20 together, while allowing some annular flexibility of the apparatus so that it can fit snugly but comfortably on wrists of different sizes. Elastomeric band 34 may extend through any number of members 20 and be anchored to the members 20 which are adjacent its end.

Figure 6:
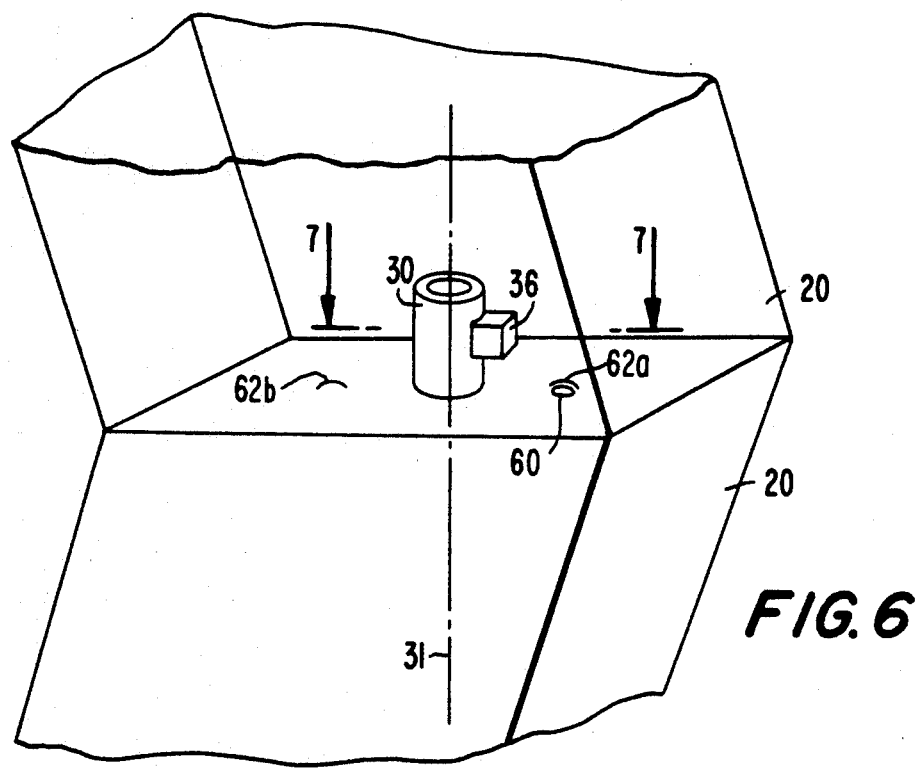
FIG. 6 is an enlarged and simplified perspective view of a portion of the apparatus of FIG. 1 showing another alternative embodiment of the invention. Some of the parts shown in FIG. 5 are shown as though transparent in order to reveal the interior construction.
Figure 7:
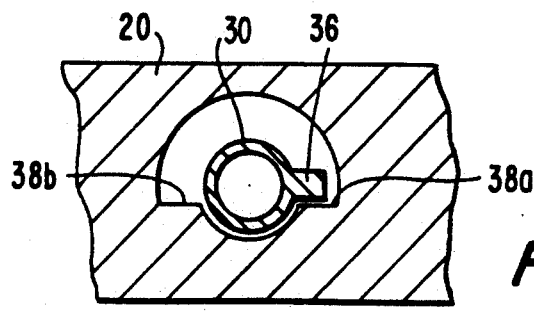
FIG. 7 is a partial sectional view taken along the line 7—7 in FIG. 6.

In the further alternative embodiment shown in FIGS. 6 and 7 each connection 30 has a key 36 which extends radially out from a portion of one side of the connection. Connection 30 is fixed to the lower one of the depicted members 20 and is rotatable in a substantially cylindrical socket in the upper one of the depicted members 20. Key 36 cooperates with stop surfaces 38a and 38b in upper member 20 to limit relative rotation of the members about axis 31 to approximately 180°. This helps prevent excessive relative rotation of members 20 which could damage electrical connections extending between the members. A spring-biased ball 60 extends part way out of the surface of depicted lower member 20 which abuts depicted upper member 20. This ball is releasable receivable in either of two recesses 62a and 62b in the abutting surface of upper member 20. Recesses 62 are spaced 180° from one another about axis 31. Accordingly, ball 60 cooperates with recesses 62 to provide detents for releasably holding adjacent members 20 in either the curved wristwatch configuration or the straight radiotelephone configuration.

Rotatable connections somewhat analogous to those described above are shown in commonly assigned, concurrently filed applications Ser. No. 07/961,656 Ser. No. 07/961,655, Ser. No. 07,961,652 all of which are hereby incorporated by reference herein.

In the C-shaped form of FIG. 1, members 20 are arranged with short edges 21 facing the wearer's wrist and long edges 23 facing away from the wearer's wrist. The lengths of edges 21 and 23 may be varied to alter the curvature of apparatus 10 in the C-shaped form. Additionally, distance H may be varied to alter the thickness of apparatus 10. Display 40 and telephone dialing buttons 44 are positioned on face 24L of member 20a and are readily visible.

When apparatus 10 is removed from the wrist, connections 30 allow members 20 to be rearranged from the C-shaped arrangement shown in FIG. 1 to the elongated, substantially straight arrangement shown in FIG. 4. To rearrange members 20 in this way, each connection 30 allows abutting members 20 to rotate 180° about an axis perpendicular to abutting faces 26. A transitional arrangement is shown in FIG. 3. Each member 20 is rotated relative to its adjacent member 20 so that in the final substantially straight arrangement, short face 24S and long face 24L of adjacent members 20 alternate. Rotation of members 20 is limited to rotation around an axis perpendicular to abutting faces 26. Furthermore, shifting of each face 26 of each member 20 out of the plane of abutment is limited by the abutting face 26 of the adjacent member 20, thereby limiting movement of members 20 out of alignment with the axis perpendicular to abutting faces 26. Thus rearrangement is relatively simple and easy to accomplish. If desired, each rotatable connection 30 may be provided with detents 180° apart as described above in connection with FIG. 6 so that members 20 tend to remain in the relative rotational positions shown in FIG. 1 or FIG. 4. Each of these rotatable connections can also be provided with a stop just beyond each detent position as described above in connection with FIGS. 6 and 7 to prevent excessive relative rotation of members 20 which could damage electrical connections running through connections 30 between the radiotelephone components of the apparatus.

When apparatus 10 has been rearranged to the elongated configuration shown in FIG. 4 and the user holds the apparatus in one hand along one side of his or her face, a radiotelephone microphone 50 on preferably one endmost member 20c (on the end of apparatus 10 adjacent buttons 44) and a radiotelephone speaker 52 on preferably the other endmost member 20c (on the end of apparatus 10 adjacent display 40) are spaced apart and otherwise positioned and oriented for simultaneous use adjacent the user's mouth and ear, respectively. Elements 50 and 52 are respectively similar to elements 6 and 8 in the above-mentioned Olsen patent. Preferably elements 40, 44, 50, and 52 are positioned on longer faces 24L of members 20. Preferably the number of members 20 and their arrangement are selected so that elements 50 and 52 will face the same direction as elements 40 and 44 when in the straight configuration of FIG. 4. Additionally, it is preferable for elements 50 and 52 to face outwardly from the wearer's wrist when in the arcuate configuration of FIG. 1 so that the wearer's wrist does not rub against elements 50 and 52.

Because all of members 20 and connections 30 are substantially rigid, and because movement of members 20 relative to one another is limited by the angles of abutting faces 26, the apparatus positively assumes substantially the same predetermined shape each time it is opened up to the radiotelephone configuration or closed to the arcuate configuration as described above. If desired, the distance Hb between faces 24S and 24L of main body member 20a and members 20b, which are immediately adjacent to main body member 20a, may be greater than distance Hc between faces 24S and 24L of remaining members 20c. Such dimensions allow apparatus 10 to more nearly resemble a conventional wristwatch in the arcuate configuration of FIG. 1 because of the raised surfaces of the central-most members 20a and 20b. Connection 30 joining members 20b and 20c preferably is positioned equidistant from faces 24S and 24L of members 20c, and slightly closer to face 24S of members 20b. Thus, members 20c remain slightly closer to face 24S of members 20b such that in the straight configuration of FIG. 4 faces 24L of members 20c are in substantially the same plane as faces 24S of members 20b. Faces 24S of members 20c are in a plane slightly spaced from the plane of faces 24L of members 20b. These dimensions also allow the user to more easily grip members 20a and 20b because face 24S of member 20a and faces 24L of members 20b extend slightly beyond the plane of apparatus 10 opposite elements 40, 44, 50, and 52. The distance between substantially trapezoidal faces 22 may also be varied to provide varying widths of apparatus 10. If desired, faces 22 of members 20a and 20b may be spaced further apart than faces 22 of members 20c for similar effects produced by providing a distance Hb greater than distance Hc.

After the apparatus has been used as a radiotelephone, it can be returned to the wristwatch configuration of FIG. 1 by reversing the above-described operations required to place apparatus 10 in the radiotelephone configuration.

It will be understood that the foregoing is merely illustrative of the principles of this invention, and that various modifications can be made by those skilled in the art without departing from the scope and spirit of the invention. For example, elements 40, 44, 50, and 52 can be placed in any desired locations on the apparatus. The present embodiments are described for the purpose of illustration rather than limitation, and the present invention is limited only by the claims which follow.

What is claimed is:

1. Apparatus which is convertible between an arcuate shape adapted for wearing around the wrist as a wristwatch and an elongated shape in which said apparatus is suitable for use as a hand-held radiotelephone with a microphone and speaker adjacent respective opposite ends of said elongated shape, said apparatus comprising:
a plurality of substantially rigid members, each said member having at least one face substantially parallel to a face of an adjacent said member; and
means for connecting said members together end to end in a series along said substantially parallel faces, each said connecting means being positioned between each adjacent pair of said members;
wherein said members are shaped and positioned such that in a first orientation said members form a substantially arcuate configuration in which said each of said substantially parallel faces abuts another of said substantially parallel faces and in a second orientation said members form a substantially straight configuration.

2. Apparatus which is convertible between an arcuate shape adapted for wearing around the wrist as a wristwatch and an elongated shape in which said apparatus is suitable for use as a hand-held radiotelephone with a microphone and speaker adjacent respective opposite ends of said elongated shape, said apparatus comprising:
a plurality of substantially rigid members, each said member having at least one face substantially parallel to a face of an adjacent said member; and
means for connecting said members together end to end in a series along said substantially parallel faces, each said connecting means being positioned between each adjacent pair of said members;
wherein said members are shaped and positioned such that in a first orientation said members form a substantially arcuate configuration and in a second orientation said members form a substantially straight configuration, and wherein said substantially parallel faces of each adjacent pair of members abut one another and said members rotate about an axis perpendicular to said abutting faces to change from said first orientation to said second orientation.

3. The apparatus defined in claim 2 wherein each said member is rotated 180° with respect to its adjacent member to change from said first orientation to said second orientation.

4. The apparatus defined in claim 2 wherein each said connecting means between a pair of adjacent members is perpendicular to said abutting faces of said members.

5. The apparatus defined in claim 2 wherein:
each said member has a pair of side faces substantially perpendicular to the longitudinal axis of said wrist when said members are in said first orientation;
each said side face has a first pair of synclinal juxtaposed edges and a second pair of substantially non-convergent juxtaposed edges; and
said abutting faces of said members join said synclinal juxtaposed edges of said side faces.

6. The apparatus defined in claim 5 wherein said side faces are trapezoidal, such that said first pair of edges are straight, synclinal edges and said second pair of edges are straight, parallel edges.

7. The apparatus defined in claim 6 wherein said second pair of edges of said side faces includes a long edge and a short edge, said long and short edges being aligned in alternating sequence when said members are in said second configuration.

8. The apparatus defined in claim 5 wherein said second pair of edges of said side faces includes a long edge and a short edge, said short edges being positioned adjacent said wrist when said members are in said first configuration.

9. The apparatus defined in claim 5 wherein said connection means are substantially perpendicular to said abutting faces and substantially equidistant from the planes defined by said second pair of edges of said side faces.

10. The apparatus defined in claim 5 wherein each said member is substantially the same dimension such that said apparatus is substantially circular when said members are in said first orientation.

11. The apparatus defined in claim 5 wherein:
said plurality of members includes a plurality of central members adjacent the top of said wrist; and
said second pair of edges of said central members are spaced further apart then said second pair of edges of the remaining said members such that said central members form thicker members than said remaining thinner members.

12. The apparatus defined in claim 11 wherein each said connecting means between a pair of adjacent members is perpendicular to said abutting faces of said members.

13. The apparatus defined in claim 12 wherein:
said second pair of edges of each of said side faces includes a long edge and a short edge; and
each said connecting means between a pair of adjacent members is equidistant from said second pair of edges of said side faces of said remaining thinner members.

14. The apparatus defined in claim 13 wherein:
each said connecting means between a thicker central member abutting a remaining thinner member is positioned closer to said short edge of said side face of said thicker central member; and
each said connecting means between a pair of adjacent thicker central members is equidistant from said long edge and said short edge.

15. The apparatus defined in claim 11 wherein said plurality of central members includes a central-most member having a radiotelephone display and radiotelephone dialing buttons and said remaining thinner members include first and second endmost members on which said microphone and said speaker are respectively disposed.

16. The apparatus defined in claim 1 wherein said arcuate shape is a C-shape.

17. The apparatus defined in claim 16 wherein said microphone is disposed in one free end of said C-shape and said speaker is disposed in the other free end of said C-shape.

18. Apparatus which is convertible between an arcuate shape adapted for wearing around the wrist as a wristwatch and an elongated shape in which said apparatus is suitable for use as a hand-held radiotelephone with a microphone and speaker adjacent respective opposite ends of said elongated shape, said apparatus comprising:

a plurality of substantially rigid members, each said member having at least one face substantially parallel to a face of an adjacent said member; and means for connecting said members together end to end in a series along said substantially parallel faces, each said connecting means being positioned between each adjacent pair of said members;

wherein said members are shaped and positioned such that in a first orientation said members form a substantially arcuate configuration and in a second orientation said members form a substantially straight configuration, and wherein each said member rotates about said connecting means about an axis substantially perpendicular to said substantially parallel faces of adjacent members.

19. The apparatus define in claim 18 wherein said connecting means is substantially perpendicular to said parallel faces of adjacent members and each said members rotates 180° about said connection means.

20. Apparatus which is convertible between an arcuate shape adapted for wearing around the wrist as a wristwatch and an elongated shape in which said apparatus is suitable for use as a hand-held radiotelephone with a microphone and speaker adjacent respective opposite ends of said elongated shape, said apparatus comprising:

a plurality of substantially rigid members, each said member having at least one face substantially parallel to a face of an adjacent said member; and means for connecting said members together end to end in a series along said substantially parallel faces, each said connecting means being positioned between each adjacent pair of said members;

wherein said members are shaped and positioned such that in a first orientation said members form a substantially arcuate configuration and in a second orientation said members form a substantially straight configuration, and wherein said means for connecting said members together end to end in a series comprises:

a hollow rotational connection between each adjacent pair of said members in said series; and prestressed resilient tension means extending between adjacent members in said series via said hollow rotational connections for holding said members together while permitting said members to rotate relative to one another about said hollow rotational connections.

* * * * *